June 7, 1955  A. BRKICH  2,710,205

SEALING DEVICE FOR ROTARY PUMP SHAFTS

Filed March 18, 1952

INVENTOR
ALEXANDER BRKICH
BY
HIS ATTORNEY

United States Patent Office 2,710,205
Patented June 7, 1955

2,710,205

SEALING DEVICE FOR ROTARY PUMP SHAFTS

Alexander Brkich, Phillipsburg, N. J., assignor to Ingersoll-Rand Company, New York, N. Y., a corporation of New Jersey Application March 18, 1952, Serial No. 277,273

3 Claims. (Cl. 286—9)

This invention relates to sealing devices, and more particularly to a sealing device for rotary pump shafts.

The invention is intended more particularly for use in structures employing separate sealing elements for sealing against the pump discharge pressure and for sealing against atmospheric pressure. Both sealing elements are immersed in sealing fluid under pressure and operate to valve a slight amount of such fluid from the ends of the sealing chamber to prevent the leakage of a foreign fluid thereinto. In prior arrangements employing two sealing elements, it has been customary to subject both to sealing fluid of the same pressure value. This is objectionable for the reason that a pressure capable of sealing against pump discharge pressure is unduly high for sealing against atmospheric pressure and causes the sealing members operating against the latter pressure to wear away at an excessively fast rate.

It is accordingly an object of the invention to so regulate the pressure of the sealing fluid that each one of a pair of sealing devices grouped to seal the same end of a pump and against different pressures will be subjected to sealing fluid pressures of no higher value than required for effective sealing.

Other objects will be in part obvious and in part pointed out hereinafter.

Figure 1:
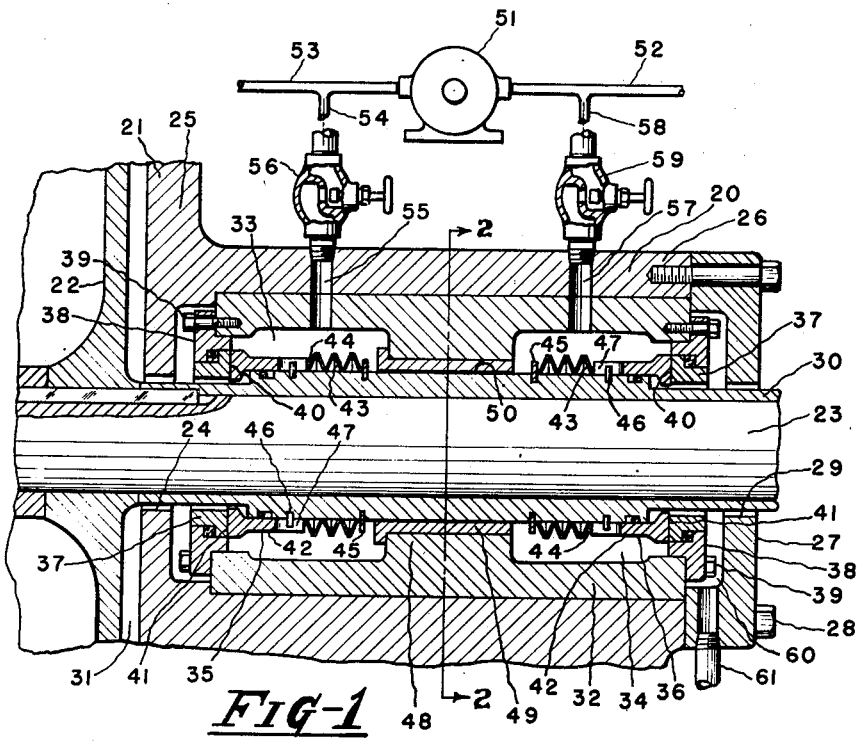
Figure 2:
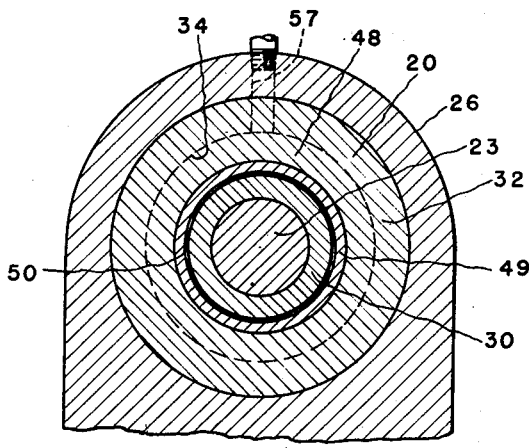

In the drawings accompanying this specification and in which similar reference numerals refer to similar parts, Figure 1 is a longitudinal view, in elevation, partly broken away, of an end portion of a centrifugal pump equipped with a sealing device constructed in accordance with the practice of the invention, and Figure 2 is a transverse view through Figure 1 taken on the line 2—2.

Referring more particularly to the drawings, 20 designates in general, the sealing device and 21 a pump to which the sealing device is applied.

Only a fragmentary portion of the pump is shown. It is of the centrifugal type having an impeller 22 keyed to a shaft 23 that extends through an opening 24 in an end wall 25 of the pump. The sealing device 20 is disposed at the outer side of the wall 25 adjacent the opening 24. It comprises a hollow extension 26 that encircles the shaft 23 and is closed at its outer end by a cover 27 which is secured to the extension 26 by bolts 28. The cover 27 also has an opening 29 for the accommodation of the shaft 23, and both openings 29 and 24 are of somewhat larger diameter than the shaft or, more particularly, than a sleeve 30 on and keyed to the shaft, to avoid contact of the rotor with the wall 25 and the cover 27.

Within the extension 26 is a bushing 32 that is recessed to provide at its inner end portion a high pressure sealing chamber 33 and at the outer end portion a low pressure sealing chamber 34, and in the chambers 33 and 34 are sealing devices 35 and 36 respectively, shown as being of the type commonly known as mechanical seals. The sealing devices are identical, and each includes a stationary component 37 which encircles the shaft 23 and is disposed within an annular holder 38 secured to the end of the bushing 32 by bolts 39. The plane surface of each stationary component 37 confronting the adjacent chamber constitutes a sealing surface 40 for sealing engagement with a similar surface 41 at the end of a sleeve 42 on the sleeve 30.

The sleeve 42 is movable axially of the shaft for adjustment with respect to the sealing surface 40 and is urged thereagainst by spring means 43 shown as a group of dish-shaped annular plates, one of which abuts the adjacent end 44 of the sleeve 42. The opposite end disk of a group seats against a spring ring 45 in the periphery of the sleeve 30, and said spring ring is so positioned that the spring means 43 will be flexed to press the sleeve 42 against the sealing surface 40.

The sleeve 42 is held against rotary movement relatively to the shaft 23 by pins 46 projecting radially from the sleeve 30 into slots 47 in the inner end portion of the sleeve 42.

On the inner surface of the bushing 32 is an annular flange 48 which separates the sealing chambers 33 and 34 from each other and serves as a holder for a bearing sleeve 49 for the sleeve 30. The bearing sleeve 49 may be secured fixedly within the flange 48 in any suitable manner and its inner surface cooperates with the periphery of the sleeve 30 to define the usual clearance 50 which also serves, in the present instance, as a restricted channel for conveying sealing fluid from the chamber 33 to the chamber 34 and to effect a reduction of the pressure of such fluid.

The fluid serving as a sealing medium in the chambers 33 and 34 may be supplied by a system especially provided for the purpose or be taken from the lubricating system of the centrifugal pump. In either case, it is essential that its pressure be somewhat higher than the pressure in the chamber 31, so that the direction of fluid flow along the sealing surfaces 40 and 41 will be toward the chamber 31, and such system comprises a pump 51 having supplying and discharge conduits 52 and 53, respectively, and a branch conduit 54 leading from the discharge conduit 53 to a point 55 opening into the chamber 33. A suitable valve 56, shown for the sake of illustration as being of the manually controlled type, is interposed in the conduit 54 for controlling the rate of flow of sealing fluid into the chamber 33.

The sealing fluid supply for the chamber 34 is conveyed thereto only by the clearance 50, and an outlet is provided for the chamber 34 by a port 57 in the bushing 32 and the extension 26 to communicate with the supply conduit 52 of the pump 51 through a branch conduit 58. The conduit 58 is also provided with a valve 59, similar to the valve 56, for controlling the rate of flow of sealing fluid from the chamber 34 to the supply conduit 52.

In the operation of the device, some of the fluid discharged by the pump 51 enters the chamber 33 at the rate permitted by the valve 56 so that a higher pressure will exist in said chamber than in the chamber 31 and sealing fluid will flow between the sealing surfaces 40 and 41 toward the opening 24. At the same time, fluid will also flow from the chamber 33 through and at the rate permitted by the clearance 50 into the chamber 34 for maintaining a film of sealing fluid between the surfaces 40 and 41 of the sealing device 36. During its course through the clearance 50 the pressure of the sealing fluid will be materially reduced and the pressure required in the chamber 34 for the correct functioning of the sealing device 36 against atmospheric pressure may be conveniently maintained by a proper setting of the valve 59.

In the arrangement shown, the sealing fluid flowing from the chamber 33 between the sealing surfaces 40 and 41 will flow into the chamber 31 to intermingle with the fluid therein, and the sealing fluid valved by the sealing device 36 will flow into a recess 60 in the inner surface of the cover 27 whence it may escape through a drain conduit 61.

I claim:

1. In a sealing device, a casing having openings in the ends thereof, a rotor in the casing and the openings, sealing chambers in the end portions of the casing, fluid pressure actuated sealing means in the chambers for valving a limited quantity of sealing fluid from the associated chamber to prevent the leakage of fluid medium from the openings into the chambers, means for supplying sealing fluid under pressure into one chamber, means for controlling the rate of flow of sealing fluid into said one chamber, means for defining a passage of restricted flow area to convey sealing fluid from said one chamber into the other chamber and to effect a reduction of the pressure of such fluid, there being an outlet in the casing for said other chamber, and means for controlling the rate of flow of sealing fluid through the outlet.

2. In a sealing device, a casing having openings in the ends thereof, a rotor in the casing extending through the openings, sealing chambers in the end portions of the casing, fluid pressure actuated sealing means in the chamber for preventing the leakage of fluid medium from the openings into the chambers, a conduit for conveying sealing fluid under pressure into one chamber, a valve in the conduit for controlling the rate of flow of sealing fluid into said one chamber, a bearing for the rotor between the chambers cooperating with the rotor to define a restricted annular flow area for conveying sealing fluid from said one chamber into the other chamber and to effect a reduction of the pressure of such fluid, an outlet for said other chamber, and a valve for controlling the rate of flow of sealing fluid through the outlet.

3. In a sealing device, a casing having openings in the ends thereof, a rotor in the casing extending through said openings, a high pressure sealing chamber at one end portion of the casing, a low pressure chamber at the opposite end portion of the casing, means for supplying sealing fluid under pressure into the high pressure chamber, a seal in the high pressure chamber arranged to valve a limited quantity of sealing fluid from said chamber to preclude leakage of foreign fluid into the high pressure chamber through the opening associated therewith, a valve for controlling the rate of flow of sealing fluid into the high pressure chamber, means for defining a passage of restricted flow area to convey sealing fluid from the high pressure chamber to the low pressure chamber and to effect a reduction of pressure of such fluid, a seal in the low pressure chamber arranged to valve a limited quantity of sealing fluid from said chamber to preclude the leakage of foreign fluid into the low pressure chamber through the opening associated therewith, an outlet in the casing for the low pressure chamber, and a valve in said outlet for controlling the pressure in the low pressure chamber.

References Cited in the file of this patent

UNITED STATES PATENTS

| | | |
|---|---|---|
| 1,859,039 | Joyce | May 17, 1932 |
| 2,332,150 | Huff | Oct. 19, 1943 |
| 2,418,620 | Brumagin | Apr. 8, 1947 |
| 2,432,576 | Koffer | Dec. 16, 1947 |
| 2,481,888 | Stratford et al. | Sept. 13, 1949 |
| 2,584,705 | Hornschuch | Feb. 5, 1952 |